Sept. 27, 1960   R. G. PIETY   2,954,471
FLOW MEASURING APPARATUS
Filed May 9, 1956   2 Sheets-Sheet 1

INVENTOR.
R. G. PIETY
BY *Hudson & Young*
ATTORNEYS

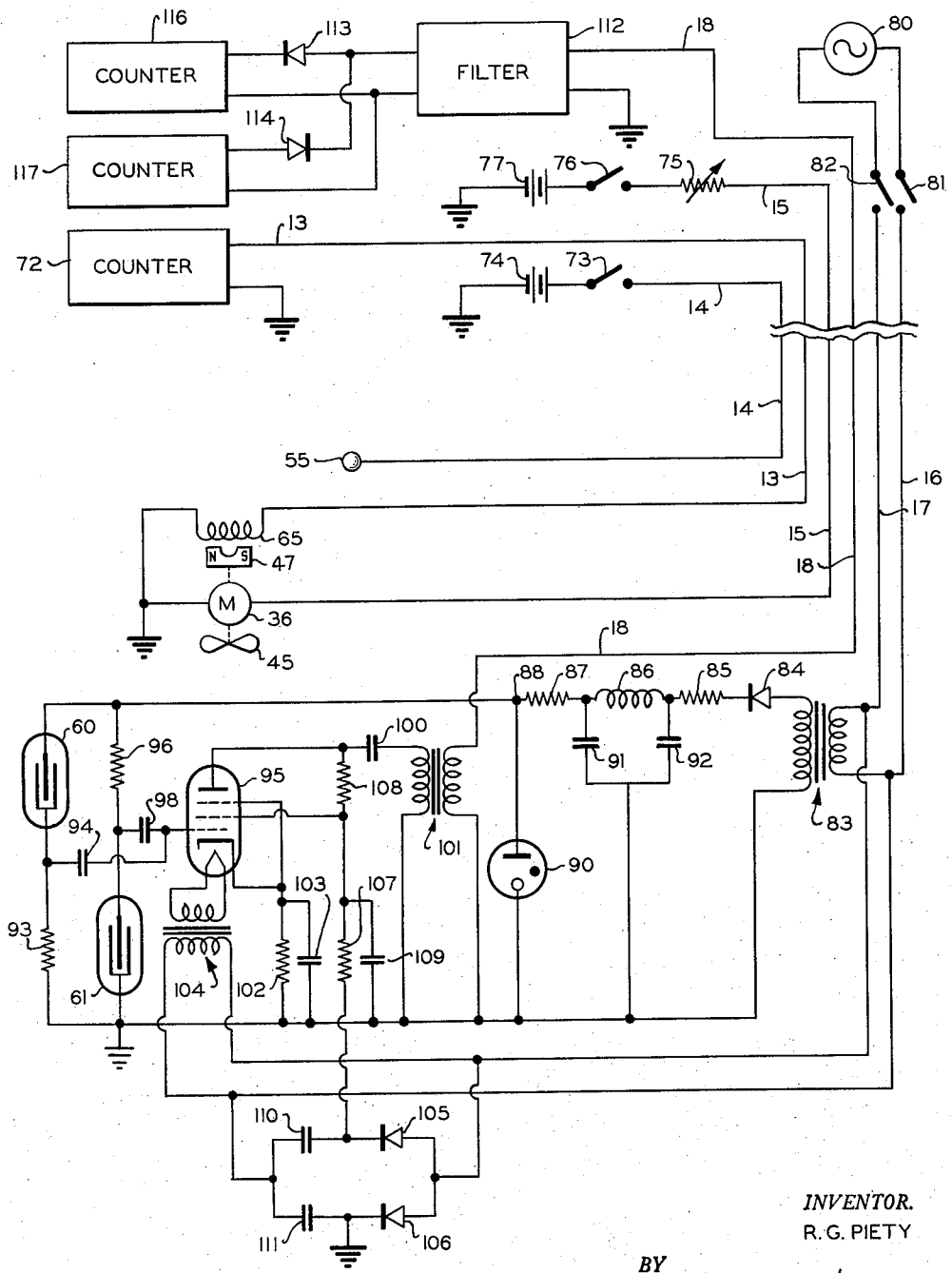

United States Patent Office 2,954,471
Patented Sept. 27, 1960

2,954,471

FLOW MEASURING APPARATUS

Raymond G. Piety, Bartlesville, Okla., assignor to Phillips Petroleum Company, a corporation of Delaware Filed May 9, 1956, Ser. No. 583,735

3 Claims. (Cl. 250—43.5)

This invention relates to apparatus for measuring fluid flow through boreholes.

In certain oil producing operations it is desirable to inject fluids through a borehole into surrounding earth formations. This is particularly true in water flooding procedures wherein water is pumped through a first borehole to enter surrounding formations and force oil deposited therein into an adjoining producing well. It is desirable to determine the rate fluid enters various sections of the borehole in order to control the rate at which oil is forced through the surrounding formations. The obvious method of measuring flow rates in boreholes is to position a conventional flow meter at different depths and measure the total flow through the well. However, this procedure requires a previous caliper survey of the borehole diameter, and is not entirely reliable because water may accumulate in cavities.

In accordance with the present invention, improved flow measuring apparatus is provided for measuring flow rates in boreholes. The apparatus comprises means defining two parallel flow paths that extend between adjacent vertically spaced sections of the borehole. A flexible packing device can be positioned to separate the two spaced regions. The major portion of the total flow through the well is directed through the first of the parallel flow paths. An impeller is positioned in this flow path to increase the flow rate by an amount sufficient to eliminate any pressure differential across the packer. A small portion of the flow through the first path enters the second path at a region near the packer, and a small amount of radioactive material is added to this fluid. This material preferably is added by electrolysis of a radioactive metal electrode. Radiation detecting means are positioned above and below the packer in the second flow path to provide an indication of the direction of fluid flow through this path. In some operations, the packer is not needed. The speed of rotation of the impeller is measured to determine the flow rate through the first path. This represents the total flow when there is zero flow through the second path.

Accordingly, it is an object of this invention to provide improved apparatus for measuring flow rates in inaccessible locations.

Another object is to provide apparatus for measuring the rates of fluid flow from a borehole into surrounding earth formations.

Other objects, advantages and features of the invention should become apparent from the following detailed description, taken in conjunction with the accompanying drawing in which:

Figure 5 is a schematic circuit diagram of the electrical components of the flow measuring apparatus.

Figure 1:
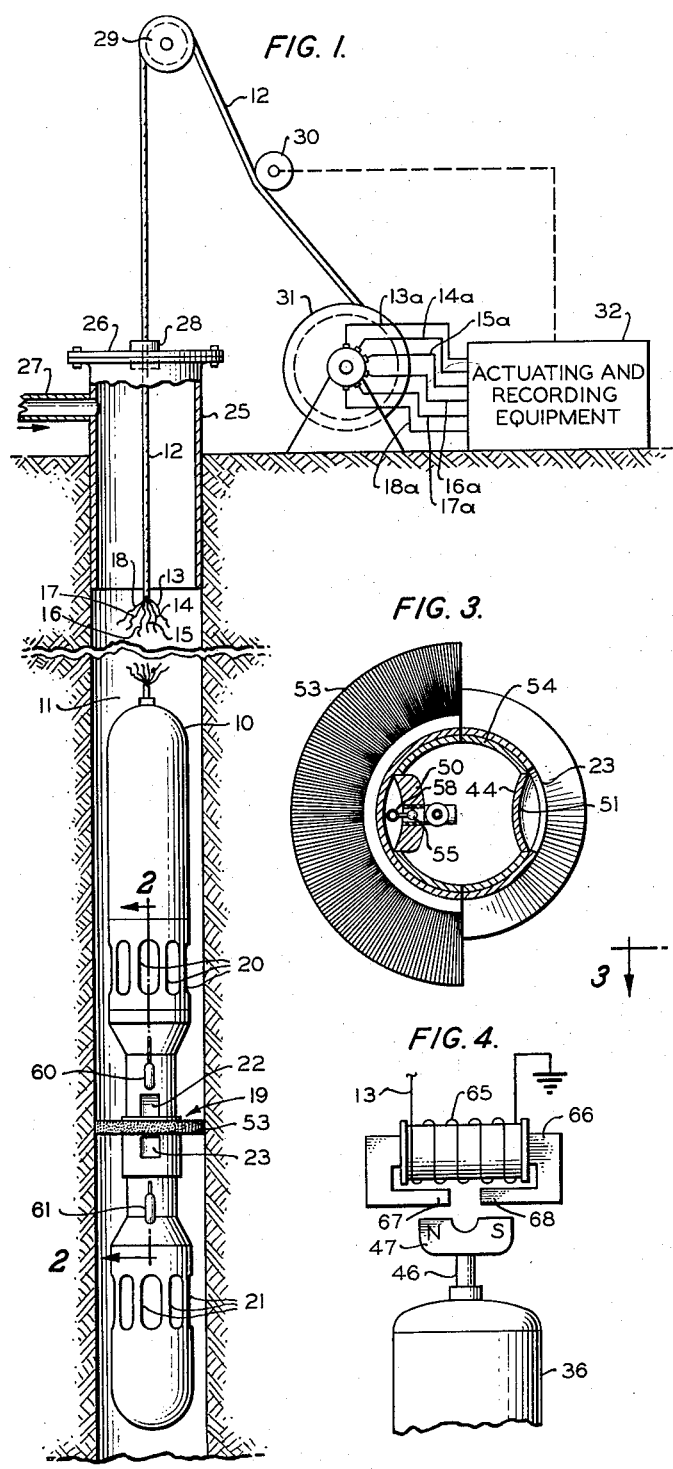
Figure 1 illustrates the water injectivity metering apparatus of this invention positioned within a borehole.

Referring now to the drawing in detail and to Figure 1 in particular, there is shown a flow measuring assembly 10 which is positioned within a borehole 11 by means of a cable 12. Cable 12 contains six electrical conductors 13, 14, 15, 16, 17, and 18. A flexible packing device 19 is secured to assembly 10 and extends outwardly therefrom to engage the wall of the borehole in substantially a fluid-tight fit. Assembly 10 is provided with a plurality of fluid inlet openings 20 located above packer 19. Fluid enters the assembly from the borehole through openings 20 and is transmitted downwardly through the assembly and back out into the borehole through a plurality of openings 21 which are located below packer 19. A second flow path is provided between the regions above and below packer 19 by openings 22 and 23 adjacent the packer.

The upper portion of borehole 11 is provided with a casing 25 which has a cap 26 secured thereto. A conduit 27 communicates with casing 25 to supply water or other fluid to the well. It is the downward flow of such water that is measured by the flow metering assembly of this invention. Cable 12 extends through a packer 28 in cap 26 and over a wheel 29. From wheel 29, the cable extends past a pulley 30 and is attached to a motivated reel 31. The conductors 13, 14, 15, 16, 17, and 18 terminate in individual slip rings on the shaft of reel 31. These slip rings are engaged by individual brushes which are connected by respective conductors 13a, 14a, 15a, 16a, 17a, and 18a to the actuating and recording equipment which is located in a housing 32. Pulley 30 rotates with cable 12 to provide an indication of the depth to which assembly 10 is lowered.

Figure 3:
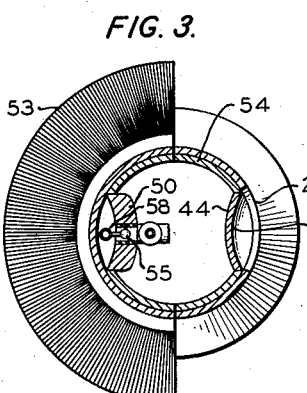
Figure 3 is a horizontal sectional view taken along line 3—3 in Figure 2.
Figure 2:
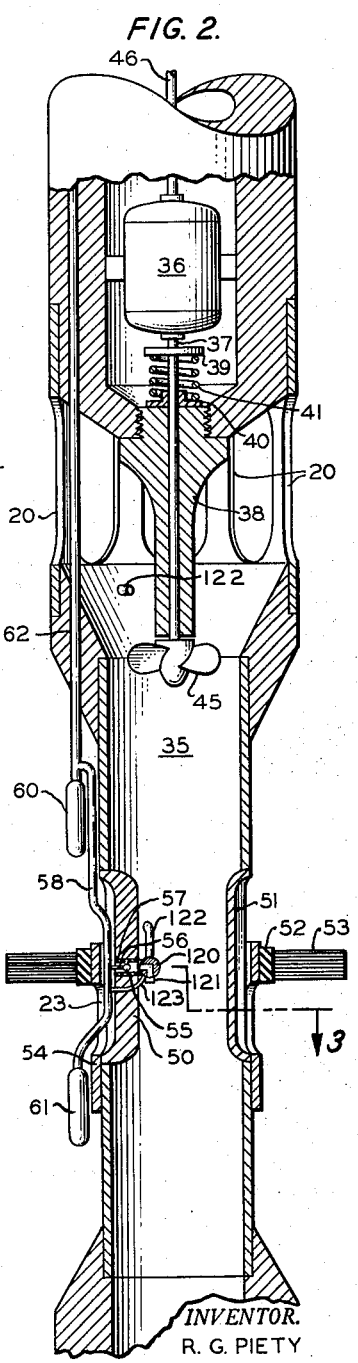
Figure 2 is a vertical sectional view taken along the line 2—2 in Figure 1.

The center section of assembly 10 is illustrated in detail in Figures 2 and 3. This section of the assembly defines a central passage 35 which extends between inlet openings 20 and outlet openings 21. A motor 36 is mounted above openings 20. A first drive shaft 37 of the motor extends downwardly through a bushing 38. A rotating collar 39 is secured to shaft 37 immediately below motor 36. A second collar 40 is positioned about shaft 37 above bushing 38. Collar 40 is free to move longitudinally on shaft 47 but is pinned to the shaft for rotation therewith. A spring 41 is disposed between collars 39 and 40 to force the latter into fluid tight engagement with a sealing ring not shown, about shaft 37 in engagement with bushing 38. An impeller 45 is attached to the lower end of shaft 37. A second drive shaft 46 extends upwardly from motor 26 and supports a permanent magnet 47 in the manner illustrated in Figure 4.

The second flow path between the regions above and below packer 19 is defined by a pair of concave plates 50 and 51 which are attached to the housing of assembly 10 adjacent packer 19. Packer 19 preferably comprises an annular rubber member 52 which has a plurality of bristles 43 extending outwardly therefrom. Bristles 53 can be impregnated with a heavy grease to form a fluid-tight barrier. Plate 50 has a central opening therein which communicates between the borehole external of the assembly, and the outlet of a valve 120. The first inlet 121 of valve 120 communicates with passage 35 adjacent the packer. The second inlet of valve 120 is connected by a conduit 122 which passes upwardly outside the assembly and back inside to a region within passage 35 above impeller 45. An electrode 55 is supported in the opening in plate 50 by an insulating rod 56. The opening in plate 50 is lined by an insulating sleeve 57. Electrode 55 is formed of or has a coating thereon of a radioactive metal, such as an isotope of chromium, iron, cobalt, gold, silver, indium, iridium, or rhenium. The material should have a relatively short half-life, such as a matter of days, to avoid lingering radiation. Chromium–51, which has a half-life of 26.5 days, can be used to advantage. An electrical lead, not shown, extends from electrode 55 upwardly through a conduit 58 in assembly 10. A first radiation detector 60 is mounted on the assembly above the electrode 55. A second radiation detector 61 is mounted on the assembly below electrode 55. Electrical leads from these detectors pass upwardly through conduits 58 and 62. Detectors 60 and 61 can advantageously be Geiger counters. Valve 120 can be electrically operated, if desired. If so, leads are connected to the surface through conduits 123, 58 and 62.

Figure 4:
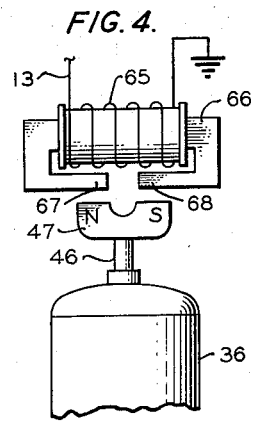
Figure 4 is a schematic view of the motor speed telemetering transmitter.

The electrical components of the measuring apparatus are contained in assembly 10 above motor 36. The speed of rotation of motor 36 is measured by the apparatus associated with magnet 47. A coil 65, see Figure 4, is mounted above magnet 47. An armature 66 extends through coil 65 and terminates in spaced pole pieces 67 and 68 which are located adjacent the poles of magnet 47. Rotation of magnet 42 thus induces a voltage across coil 65. The frequency of the induced signal is proportional to the speed of rotation of magnet 42. The first end terminal of coil 65 is connected to ground, and the second end terminal is connected to conductor 13 in cable 12.

The electrical equipment employed to operate the flow measuring apparatus is illustrated schematically in Figure 5. The upper end of conductor 13 is connected to the first terminal of a counter circuit 72 which measures the frequency of pulses induced in coil 65. Electrode 55 is connected to conductor 14 which is connected through a switch 73 to the positive terminal of a voltage source 74. The negative terminal of voltage source 74 is connected to ground. One terminal of motor 36' is grounded. The second terminal of motor 36 is connected to conductor 15 which is connected through a variable resistor 75 and a switch 76 to one terminal of a voltage source 77. The second terminal of voltage source 77 is conducted to ground.

A source of alternating current 80 is connected through switches 81 and 82 across conductors 16 and 17. These two conductors are connected to the end terminal of the primary winding of a transformer 83 which is positioned in housing 10. The first terminal of the second winding of transformer 83 is connected through a rectifier 84, a resistor 85, an inductor 86, and a resistor 87 to a potential terminal 88. The second terminal of the secondary winding of transformer 83 is connected to ground, which can be represented by the housing of assembly 10. A voltage regulating tube 90 is connected between terminal 88 and ground. Capacitors 91 and 92 are connected between ground and the respective end terminals of inductor 86. The circuit thus far described rectifies the alternating current from source 80 to provide a direct current potential between terminal 88 and ground.

Geiger tube 60 and a resistor 93 are connected in series relationship between terminal 88 and ground. The junction between these elements is connected by a capacitor 94 to the control grid of a pentode 95. A resistor 96 and Geiger tube 61 are connected in series relationship between terminal 88 and ground. The junction between these elements is connected by a capacitor 98 to a control grid of pentode 95. The anode of pentode 95 is connected by a capacitor 100 to the first terminal of the primary winding of a transformer 101. The second terminal of the primary winding of transformer 101 is connected to ground. The cathode and the suppressor grid of pentode 95 are connected to ground through a resistor 102 which is shunted by a capacitor 103. The filament of pentode 95 is connected across the secondary winding of a transformer 104.

The end terminals of the primary winding of transformer 104 are connected to conductors 16 and 17, respectively. The first terminals of rectifiers 105 and 106 are connected to conductor 17. The second terminal of rectifier 105 is connected through series-connected resistors 107 and 108 to the anode of pentode 95. A capacitor 110 is connected between the second terminal of rectifier 105 and conductor 16. A capacitor 111 is connected between the second terminal of rectifier 106 and terminal 16. The junction between rectifier 106 and capacitor 111 is connected to ground. The rectifiers and capacitors thus provide a source of direct potential which is applied to the anode of pentode 95.

The first terminal of the secondary winding of transformer 101 is connected to ground. The second terminal of this transformer winding is connected to conductor 18. The upper end of conductor 18 is connected to the first input terminal of a filter circuit 112 which is tuned to reject signals of the frequency of current source 80. The second input terminal of filter 112 is connected to ground. The first output terminal of filter 112 is connected through respective rectifiers 113 and 114 to counter circuits 115 and 116. The second output terminal of filter 112 is connected to the second input terminals of counter circuits 116 and 117. Rectifiers 113 and 114 are connected oppositely so that counter 116 registers pulses of a first polarity and counter 117 registers pulses of opposite polarity.

Pentode 95 normally is biased so as to operate a region near the center of its characteristic curve. In this manner, both positive and negative input pulses result in output signals from the pentode. It should be evident that a positive pulse is applied to the control grid of pentode 95 each time tube 60 is actuated and that a negative pulse is applied to the control grid of pentode 95 each time tube 61 is actuated. The output pulses from pentode 95 are applied through transformer 101 and filter 112 to counters 116 or 117. Positive pulses are registered by counter 116 and negative pulses are registered by counter 117.

As previously mentioned, the flow measuring apparatus of this invention is particularly useful in measuring downward flows through borehole 11. The first method of operating the apparatus involves lowering assembly 10 to the region at which the downward flow of water is to be measured. It should be evident that the flowing water can follow one of two paths. The main flow path is through passage 35 in the assembly. The secondary flow path is between openings 22 and 23. The speed of rotation of impeller 45 is adjusted by means of variable resistor 75 until there is a zero flow between openings 22 and 23. Rotation of impeller 45 increases the flow through passage 35 to tend to eliminate any pressure differential across packer 19 so that a zero flow between openings 22 and 23 can exist. Under this condition, the speed of rotation of impeller 45, which is a function of the flow through passage 35, represents the total flow past the assembly. The speed of motor 36 is adjusted by resistor 75 until this relationship is obtained. The speed of rotation of impeller 45 is measured by counter 72 which is calibrated in terms of flow rates.

The condition of zero flow between openings 22 and 23 is detected by means of Geiger counters 60 and 61 and electrode 55. Valve 120 is operated to connect inlet 121 to the opening in plate 50. Switch 73 is closed so that a positive potential, with respect to grounded plate 50, is applied to electrode 55. A portion of the radioactive material on electrode 55 is removed from the electrode by electrolysis so that radioactive ions are introduced into the fluid which flows outwardly through the opening in plate 50. If there is a zero pressure differential across packer 19, the radioactive ions tend to diffuse upwardly and downwardly at the same rate so that tubes 60 and 61 are actuated uniformly. If a downward flow should exist between openings 22 and 23, counter 61 provides a more rapid output signal than counter 60. This condition can then be eliminated by increasing the speed of impeller 45 until the pressure differential across packer 19 is eliminated. If the flow should be in an upward direction, tube 60 is actuated at a more rapid rate. This condition can be eliminated by decreasing the speed of impeller 45.

A second mode of operating the flow measuring apparatus involves rotating impeller 45 at a uniform speed. Assembly 10 is then raised or lowered through borehole 11 until a region is located at which there is zero flow between openings 22 and 23. While packer 19 increases the sensitivity of the assembly by reducing the area of the bypass flow path, this packer is not essential in all operations. Whenever impeller 45 is operated at the proper speed, there is no tendency for flow to occur in a vertical direction outside passage 35. Packer 19 is, therefore, not needed. This is an important advantage when the assembly is operated in boreholes which are either too narrow or too wide for the use of available packers. The radioactive source and detectors provide an extremely accurate indication of flow.

While the flow measuring system of this invention has been described in conjunction with water injection operations, it should be evident that the invention is not limited to such procedures. Upward flow through a producing well can be measured by operating valve 120 so that conduit 122 communicates with the passage through plate 50 and by reversing the direction of rotation of impeller 45. A second possible procedure for measuring upward flow comprises turning the assembly upside down without changing valve 120, or positioning impeller for rotation in the reverse direction below packer 53 without changing valve 120.

While the invention has been described in conjunction with the present preferred embodiment, it should be evident that it is not limited thereto.

What is claimed is:

1. Apparatus for measuring the rate of fluid flow through a passage comprising a structure adapted to be positioned within the passage; packing means extending outwardly from said structure to engage the walls of the passage to divide the passage into first and second regions; first conduit means carried by said structure to communicate between said first and second regions; second conduit means carried by said structure to communicate between said first and second regions; an impeller positioned in said first conduit means; a motor to rotate said impeller at controllable rates to direct fluid through said first conduit means; means to inject a radioactive substance into said second conduit means comprising means forming a flow passage having the outlet thereof connected to said second conduit means, an electrode positioned within and electrically insulated from the walls of said flow passage, means applying a voltage between said electrode and said structure, and valve means having the outlet thereof connected to the inlet of said flow passage, said valve means having a first inlet communicating with said first conduit means on one side of said impeller and a second inlet communicating with said first conduit means on the other side of said impeller, the outlet of said valve means being adapted to communicate with one of said inlets at a time; first and second radiation detectors positioned adjacent the respective ends of said second conduit means to indicate the presence of said substance; and means to measure the speed of rotation of said impeller, the speed of rotation of said impeller being a measure of the rate of flow through said first conduit means.

2. Apparatus for measuring fluid flow comprising a housing defining a fluid conduit; said housing being adapted to be positioned in the region of flow to be measured; an impeller positioned in said conduit to increase the flow therethrough; means to rotate said impeller at controllable speeds; means to inject an identifiable substance into the region exterior of said housing between the ends of said conduit comprising conduit means carried by said housing and having a source of radioactive material therein, the outlet of said conduit means communicating with said region exterior of said housing, first and second fluid inlets in said conduit on opposite sides of said impeller, respectively, and valve means to connect said fluid inlets selectively to the inlet of said conduit means; first and second detectors positioned in the region exterior of said housing on respective opposite sides of the point of injection of said material, said detectors being adapted to indicate the presence of said substance; and means to measure the speed of rotation of said impeller.

3. Apparatus for measuring fluid flow comprising a housing defining a fluid conduit, said housing being adapted to be positioned in the region of flow to be measured, means positioned in said conduit to increase flow therethrough at a controllable rate, conduit means carried by said housing, the outlet of said conduit means communicating with a region exterior of said housing between the ends of said conduit, first and second fluid inlets in said conduit on opposite sides of said means to increase flow, respectively, valve means to connect said fluid inlets selectively to the inlet of said conduit means, means to inject an identifiable substance into said conduit means, first and second detectors positioned in the region exterior of said housing on respective opposite sides of the outlet of said conduit means, said detectors being adapted to indicate the presence of said substance, and means to measure the rate of fluid flow through said conduit.

References Cited in the file of this patent

UNITED STATES PATENTS

| | | |
|---|---|---|
| 2,599,975 | Carpenter | June 10, 1952 |
| 2,654,433 | Piety | Oct. 6, 1953 |
| 2,659,046 | Arps | Nov. 10, 1953 |
| 2,688,872 | Hartline | Sept. 14, 1954 |
| 2,700,734 | Egan et al. | Jan. 25, 1955 |
| 2,714,168 | Hencke et al. | July 26, 1955 |
| 2,729,101 | Wiley | Jan. 3, 1956 |
| 2,822,688 | Wiley | Feb. 11, 1958 |
| 2,842,961 | Doll | July 15, 1958 |